(12) United States Patent
Wong

(10) Patent No.: US 11,334,252 B2
(45) Date of Patent: May 17, 2022

(54) DYNAMIC DATA COMMUNICATION IN AN ENCAPSULATED AREA

(71) Applicant: DYNALINK TECHNOLOGIES, LLC, Sugar Land, TX (US)

(72) Inventor: Chun Wong, Sugar Land, TX (US)

(73) Assignee: DYNALINK TECHNOLOGIES, LLC, Sugar Land, TX (US)

(*) Notice: Subject to any disclaimer, the term of this patent is extended or adjusted under 35 U.S.C. 154(b) by 329 days.

(21) Appl. No.: 15/632,840

(22) Filed: Jun. 26, 2017

(65) Prior Publication Data

US 2018/0039430 A1 Feb. 8, 2018

Related U.S. Application Data

(60) Provisional application No. 62/371,935, filed on Aug. 8, 2016.

(51) Int. Cl.
| | | |
|---|---|---|
| *G06F 16/23* | (2019.01) | |
| *G06F 16/00* | (2019.01) | |
| *G06F 3/06* | (2006.01) | |
| *G06Q 30/02* | (2012.01) | |

(52) U.S. Cl.
CPC .......... *G06F 3/0617* (2013.01); *G06F 3/0604* (2013.01); *G06F 16/2372* (2019.01); *G06Q 30/0241* (2013.01); *G06F 3/067* (2013.01); *G06F 16/00* (2019.01)

(58) Field of Classification Search
CPC .. G06F 3/0617; G06F 16/2372; G06F 3/0604; G06F 16/00; G06F 3/067

USPC ........................................................ 707/609
See application file for complete search history.

(56) References Cited

U.S. PATENT DOCUMENTS

| | | |
|---|---|---|
| 6,636,894 B1 | 10/2003 | Short et al. |
| 7,769,764 B2 | 8/2010 | Ramer et al. |
| 8,370,204 B2 | 2/2013 | Gautam et al. |
| 2006/0218296 A1* | 9/2006 | Sumner ............. H04L 29/12066 709/238 |
| 2008/0288325 A1 | 11/2008 | Pavlov |
| 2011/0040625 A1 | 2/2011 | Woodruff et al. |
| 2012/0233351 A1* | 9/2012 | Gorgens .............. H04L 61/1511 709/245 |

(Continued)

FOREIGN PATENT DOCUMENTS

| | | |
|---|---|---|
| CN | 102984649 A | 3/2013 |
| CN | 103035183 A | 4/2013 |

(Continued)

*Primary Examiner* — Shahid A Alam

(74) *Attorney, Agent, or Firm* — D'Ambrosio & Menon, PLLC; Usha Menon

(57) ABSTRACT

The present disclosure relates to a micro-server configured for providing access to specific information through a private wireless network and without requiring Internet access. When a Wi-Fi-enabled device is connected to the micro-server over the wireless network, the specific information is provided automatically to the web browser or a software application of the Wi-Fi-enabled device. The micro-server facilitates interactive communication with the connected Wi-Fi-enabled device within an encapsulated area defined by the wireless connection. When the wireless connection is disconnected, the Wi-Fi-enabled device can continue to access the same or at least a variant of the specific information from a web server on the Internet.

17 Claims, 14 Drawing Sheets

(56) References Cited

U.S. PATENT DOCUMENTS

| | | |
|---|---|---|
| 2013/0041761 A1 | 2/2013 | Voda |
| 2013/0079036 A1 | 3/2013 | Sharet |
| 2013/0102248 A1* | 4/2013 | Jay .......................... H04L 67/02 |
| | | 455/41.1 |
| 2013/0297422 A1* | 11/2013 | Hunter ............... G06Q 30/0261 |
| | | 705/14.58 |
| 2014/0085666 A1* | 3/2014 | Park .................... G06K 15/405 |
| | | 358/1.15 |
| 2014/0188619 A1 | 7/2014 | Ravindran et al. |
| 2014/0316892 A1 | 10/2014 | L'Heureux |
| 2014/0351054 A1 | 11/2014 | Ahn et al. |
| 2014/0366117 A1* | 12/2014 | Kumar ................... H04L 63/02 |
| | | 726/11 |
| 2015/0154635 A1* | 6/2015 | Randall .................. G06Q 30/00 |
| | | 705/14.53 |
| 2015/0163206 A1* | 6/2015 | McCarthy ........... G06F 21/6218 |
| | | 726/4 |
| 2015/0287102 A1 | 10/2015 | Gupta et al. |
| 2017/0041296 A1* | 2/2017 | Ford ...................... G06F 16/951 |
| 2017/0104708 A1* | 4/2017 | Reddy ..................... H04L 51/20 |
| 2017/0257750 A1* | 9/2017 | Gunasekara ............ H04W 4/06 |
| 2017/0339566 A1* | 11/2017 | Yasuda ................. H04L 67/141 |
| 2018/0027070 A1* | 1/2018 | Jhanji ................. H04L 67/1046 |
| | | 709/217 |

FOREIGN PATENT DOCUMENTS

| | | | |
|---|---|---|---|
| CN | 202872838 U | 4/2013 | |
| CN | 104333575 A | 2/2015 | |
| CN | 204791851 U | 11/2015 | |
| WO | 2014124606 A1 | 8/2014 | |
| WO | WO-2015013847 A1 * | 2/2015 | ......... G06Q 30/0269 |

\* cited by examiner

DYNAMIC DATA COMMUNICATION IN AN ENCAPSULATED AREA

CROSS-REFERENCE TO RELATED APPLICATIONS

The present application claims priority to provisional application Ser. No. 62/371,935 filed on Aug. 8, 2016, the contents of which are incorporated by reference in its entirety.

BACKGROUND AND FIELD OF INVENTION

The present disclosure relates to data communication. In particular, the present disclosure pertains to a system and method for dynamic data communication in an encapsulated area.

The use of smart devices has become a common phenomenon. Users utilize these devices for a variety of functions from checking their emails to paying for commercial transactions. Studies have shown that a large number of users now also access the Internet primarily through their smart devices as opposed to their desktops/laptops. The smart devices can connect to the Internet via different wireless communication protocols. The users of these devices can then access information available on the Internet through web browsers or software applications ("apps").

SUMMARY

A wireless Access Point (AP) allows a wireless-enabled device to connect to a wired network. The wireless AP can connect to a router (via a wired network) as a standalone device, but it can also be an integral component of the router itself. The Wi-Fi connection may be used to transfer online contents between networked servers and clients. The use of wireless APs has become popular in providing free wireless connections for smart devices over the past decade as the cost of transferring Internet content over the mobile network has been high. Wireless APs are commonly used to support free public Internet hotspots and other business networks where larger buildings and spaces need wireless coverage. However, these "free" Wi-Fi hotspots are not really free at least to their providers. The provider of the hotspot needs to subsidize it or to generate revenue by selling advertisements to cover its costs. At the same time, with the cost of mobile networks dropping in recent years, the need for free Wi-Fi hot spots has reduced in some places.

There are instances where smart devices cannot access the Internet due to poor connectivity or due to high Internet traffic. A smart device can include, without limitation, a smart phone, a tablet and a smart watch. It can also be difficult for these devices to access data that is not publicly available using the Internet but is only available through specific offline resources. There is, therefore, a need for an apparatus that will work as a multipurpose device, which utilizes one or more hardware and software elements/components and/or sensors to allow a user to dynamically access specific information in an encapsulated area where Internet access may be limited or unavailable. The one or more embodiments of the invention provide such a multipurpose device.

According to an embodiment, a special purpose communication device is provided to allow users of smart devices to access specific information in an encapsulated area. The special purpose communication device comprises a "micro-server". The micro-server may be a single board computer. The micro-server may include an embedded wireless Access Point to establish a Wi-Fi connection with a user's smart device within the encapsulated area. Alternately, the micro-server may be connected to an external wireless AP. A private wireless network connection may be established between the smart device connection and the micro-server. After the connection is established, the micro-server can communicate the specific information to the connected smart device over the private wireless network connection.

The micro-server may be pre-configured with the specific information. The specific information may be typically selected from the group consisting of stored data, real-time data and a combination of the stored data and real-time data. In an embodiment, the specific information may be an operator provided URL that is pre-configured on the micro-server. The specific information may further include informational and commercial content, such as, advertisements, detailed descriptions or presentations of an object or a localized area, points of interest in a nearby locale, directories of nearby areas or objects, directory information of an area, directions to an object or to a nearby area and multimedia content or presentations of an object or nearby area.

In one embodiment, a Web server service running on the micro-server can communicate a pre-configured uniform resource locator ("URL") string to a web browser of a user's connected smart device. The URL may be a valid URL on the Internet. The information can then be accessed on the web browser or pre-installed software of the user device.

Typically, in fully automatic machine-to-machine interactions, automatic data collection requires the installation of a software application on the user's machine. On the contrary, the one or more embodiments utilize a standard web browser on the user's smart device to display the specific information. Advantageously, the user does not have to download or install any software application in order to access the information.

In another embodiment, the micro-server is pre-configured to receive data on one or more parameters from any Wi-Fi-enabled device. The data can then be communicated to the user device.

Advantageously, the micro-server is configured to use existing network routing technologies to provide access to specific or desired information in a localized area through Wi-Fi and without requiring Internet connectivity. Furthermore, the user does not have to search for the specific information using their web browser. Instead, when the user's smart device is paired or connected to the micro-server over Wi-Fi, the specific information is provided automatically by dynamically refreshing the web browser. In other embodiments, upon establishing a connection with the micro-server, a pop up web browser may be automatically generated. The pop up may include advertisements or other specific information. The micro-server may also be configured to communicate a specific URL to the web browser of the smart device. This URL may be used to redirect the web browser of the user's smart device to another web page on the Internet when the device is disconnected from the micro-server. Thus, the smart device can continue to pull information from the Web server on the Internet even after the smart device is disconnected from the micro-server and the user may be redirected to view the specific content.

DETAILED DESCRIPTION

Figure 1A:
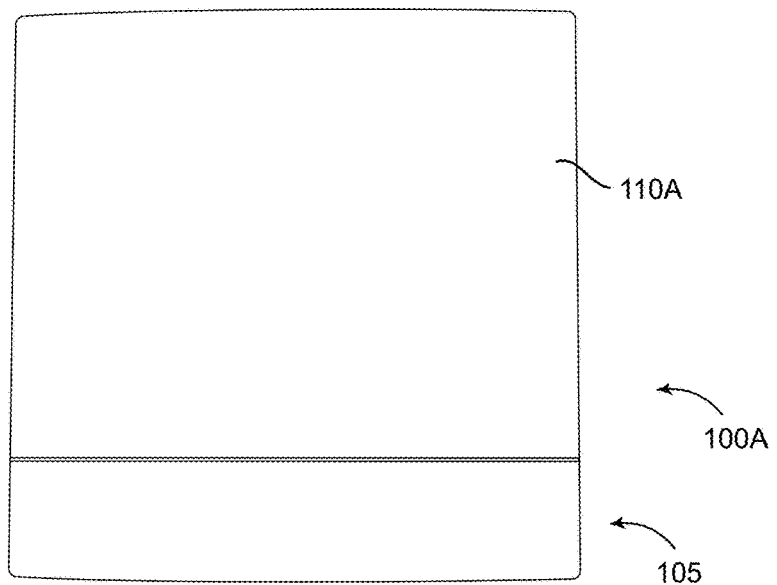
FIGS. 1A-1B illustrate a micro-server with an integrated wireless Access Point according to an embodiment of the invention.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a special-purpose processor programmed with the instructions to perform the steps.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Figure 1B:
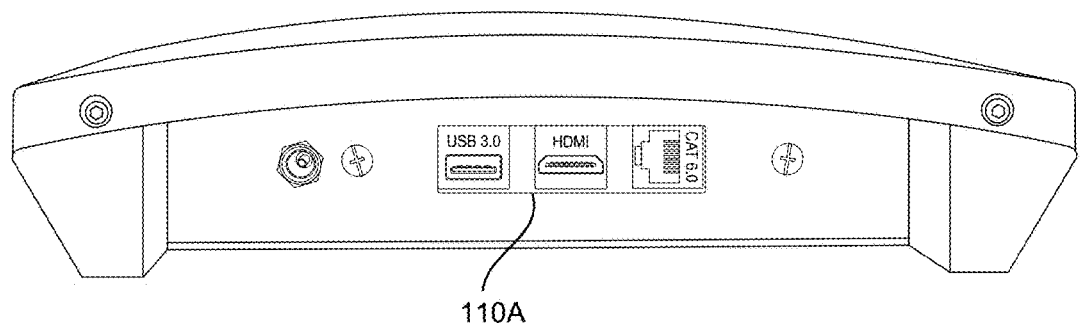

FIGS. 1A-1B represent a first embodiment of a special purpose device for allowing a paired or connected device to access specific information in an encapsulated area. In an embodiment, the special purpose device 100A comprises a micro-server. FIG. 1A depicts a perspective view of an embodiment of the micro-server 110A while FIG. 1B depicts a rear view of the micro-server 110A. The micro-server 110A comprises a self-contained system having various components (as described below with reference to FIG. 1E) including a wireless/Wi-Fi Access Point ("AP") enclosed within a base unit 105 with the exception of a power adapter. As shown in FIG. 19, the micro-server 110A can have four ports, including, a power input, a HDMI port, a USB port and an Ethernet port.

Figure 1C:
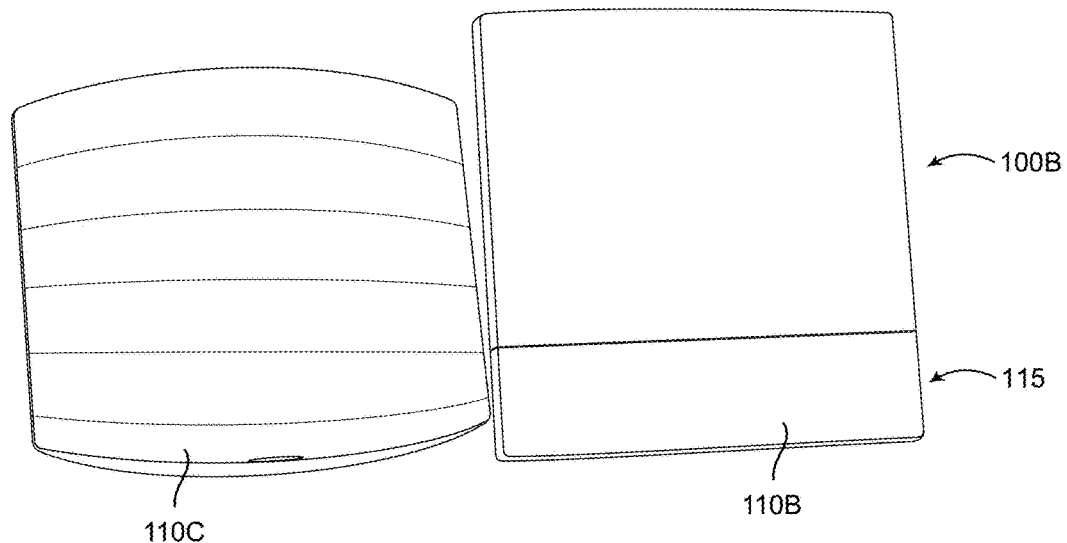
FIGS. 1C-1D illustrate a micro-server with an external wireless Access Point according to another embodiment of the invention.
Figure 1D:
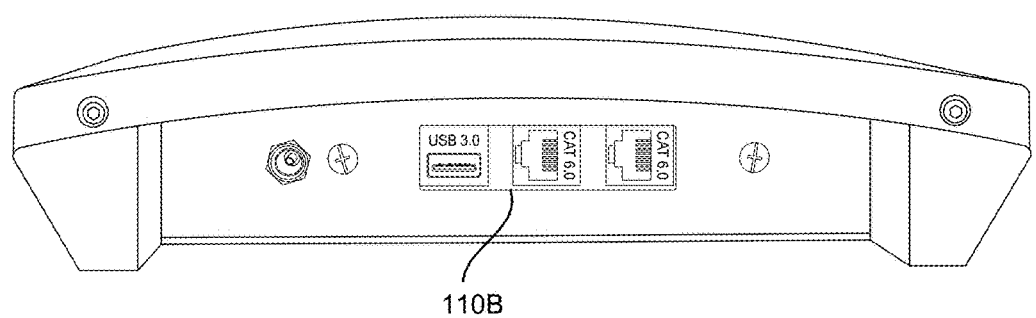

FIGS. 1C-1D illustrate a front and rear view of a second embodiment of the special purpose device 100B comprising a micro-server 110B. The micro-server 110B comprises all the components of micro-server 110A contained within base unit 115 with the exception of the Wi-Fi AP. Instead, the Wi-Fi AP 110C is external to the base unit 115. As shown in FIG. 1C, micro-server 110B includes four ports, a power input, a USB, a Gigabit Ethernet (AP) and a Gigabit Ethernet (WAN). The Wi-Fi AP 110C may be known in the art, however, it should include at least a Gigabit Ethernet port and a DC power input port. Many modifications to the depicted micro-server 110A, 110B may be made by those skilled in the art without departing from the scope of the invention as recited by the claims. The micro-server can also include a video interface and an audio interface (not shown). The video and audio interfaces are either an analog or a digital interface.

The micro-server (hereinafter 110) can be paired to a "smart device" (not shown). The term "smart device" and "Wi-Fi-enabled device" is used interchangeably in the present disclosure. The micro-server 110 can be configured to communicate specific information to the connected smart devices directly or through a wireless connection. The smart devices may include devices with Wi-Fi capability, for example, smart phones, tablet computing devices, smart watches, computers, and/or any computing devices with Wi-Fi capability. The specific information may be a URL that is pre-configured on the micro-server 110. The specific information can include pre-stored or dynamic real-time content. The specific information may include advertisements, detailed descriptions or presentations of an object or a localized area, points of interest in a nearby locale, directories of nearby areas or objects, directory information of an area, directions to an object or to a nearby area, multi-media presentations of an object or nearby area, and/or stored or real time data. An encapsulated area is a confined area. For example, an encapsulated area may include an area covered by the wireless signals from the wireless AP. The encapsulated area may be dependent on the range of the Wi-Fi network.

Figure 1E:
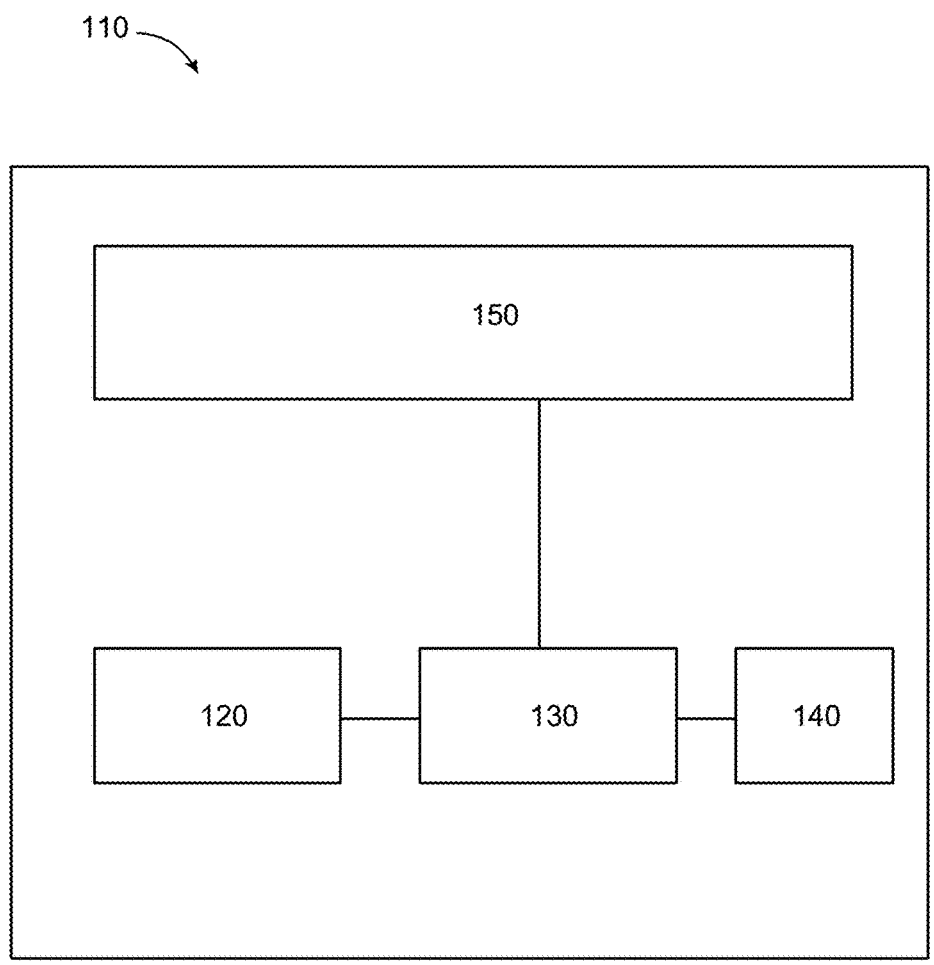
FIG. 1E illustrates a block representation of various components of a micro-server with an embedded wireless Access Point according to an embodiment of the invention.

Now referring to FIG. 1E, a schematic illustration of a micro-server 110 is depicted. The micro-server 110 can be configured for dynamically communicating data in an encapsulated area. The micro-server 110 can include a single board computer (SBC) capable of running an operating system with server services. It should be appreciated that micro-server 110 is only one example of a single board computer device, and that micro-server 110 optionally has more or fewer components than shown, optionally combines two or more components, or optionally has a different configuration or arrangement of the components. The various components shown in FIG. 1E can be implemented in hardware, software, or a combination of both hardware and software, including one or more signal processing and/or application-specific integrated circuits.

The micro-server 110 includes at least one processor 120. Processor 120 may be a programmable central processing unit (CPU) configured for executing programmed instructions stored in memory 130. The processor unit 120 may be implemented using one or more heterogeneous processor systems in which a main processor is present with secondary processors on a single chip. In another example, processor 120 may be a symmetric multi-processor system containing multiple processors of the same type. Processor 120 may be a reduced instruction set computing (RISC) microprocessor, an x86 compatible processor, or any other suitable processor. In various examples, processor 120 may include a multi-core processor, such as a dual core or quad core processor. Processor 120 may include multiple processing chips on one die, and/or multiple dies on one package or substrate. Processor 120 may also include one or more levels of integrated cache memory, for example.

Memory 130 can include volatile and non-volatile memory. Memory 130 can include a random access semiconductor memory (RAM) for storing application data, i.e., computer program data, for processing. While memory 130 is depicted conceptually as a single monolithic entity, in various examples, memory 130 may be arranged in a hierarchy of caches and in other memory devices in various forms. While memory 130 is depicted physically separated from processor 120 and other elements of micro-server 110, memory 130 may refer equivalently to any intermediate or cache memory at any location throughout micro-server 110, including cache memory proximate to or integrated with processor 120 or individual cores of processor 120.

Data storage 140 may include one or more SD card/slots, eMMC card, Compact Flash card, flash drives/devices, rewritable optical disc drives, or other data storage mediums. The computer-readable storage mediums may be tangible and non-transitory. The machine-readable storage medium 140 tangibly embodies thereon computer executable code or instructions, which may be may be loaded from data storage 140 into memory 130 to be read and executed by processor 120 or other processors used to communicate pre-stored or real-time data to a connected smart device to form a process. Data storage 140 may also include any other hardware elements capable of storing information, such as, for example and without limitation, data, program code in functional form, and/or other suitable information, either on a temporary basis and/or a permanent basis. Data storage 140 and memory 130 are examples of physical computer-readable data storage devices. Data storage 140 may include any of various forms of volatile memory that may require being periodically electrically refreshed to maintain data in memory, while those skilled in the art will recognize that this also constitutes an example of a physical computer-readable data storage device. Executable instructions may be stored on a medium when program code is loaded, stored, relayed, buffered, or cached on a physical medium or device, including if only for only a short duration or only in a volatile memory format.

The micro-server 110 can further include a serial port, a Serial Peripheral interfaces (SPI) bus, and/or an inter-integrated circuit (I2C) bus (not shown). The micro-server 110 can have additional analog outputs to enable connectivity to one or more remote sensors.

The micro-server 110 further includes a power source (not shown). The power source may be a regulated power source or an unregulated. DC power source. The regulated power source may include a regulated power supply for converting utility power to power that is useful for the micro-server or a regulated power supply for converting unregulated DC power source to power that is useful for the micro-server. The unregulated DC power source may further be selected from a group consisting of a battery, a DC power source from a generator or engine; a solar panel and a wind power generator.

The micro-server 110 further includes an embedded communications component 150. The communications component 150 can include a short-range wireless transmitter/receiver that may communicate with a smart device, as described below with reference to FIGS. 2A and 2B. Short-range wireless transmitter/receiver may, for example, comprise an IEEE 802.11 transmitter and/or IEEE802.11 receiver and/or a Bluetooth transmitter and/or Bluetooth receiver. In certain embodiments, the communications component 150 may include an integrated WiFi/BLE module. In certain other embodiments, the micro-server 110 may be connected to an external wireless AP (not shown) through its USB or Ethernet ports (not shown). Alternately, the external wireless AP may be connected to the micro-server 110 through one of its buses or ports or interfaces.

The micro-server services can include a TCP/IP network stack, a DHCP server, a DNS server, a web server, a database, and at least one content specific application software. The micro-server 110 may execute processing operations or logic for the web server services using the processor 120. The micro-server 110 may execute communications operations or logic for the web services using communications component 150 or an external wireless AP. The micro-server 110 may communicate with smart devices over a communications media via the communications component 150 or an external wireless AP.

Although this description is directed to a Wi-Fi communication unit in this embodiment of the present disclosure, it can be replaced with other types of short range wireless communication modules such as low energy Bluetooth module without restriction thereto.

The micro-server 110 can provide specific information or content instead of providing Internet connection to any smart/Wi-Fi-enabled connected device. The specific information may be provided by an operator of the micro-server 110 and may be customized for a user experience in the encapsulated area. The networking controls can be configured to a captive portal (interchangeably called a "walled garden") using DNS and/or network routing rules to redirect all client web requests via wireless/Wi-Fi connection to the Web server service running on the micro-server 110. The micro-server 110 can be configured to block Internet requests from the connected devices to the Internet even though the micro-server 110 itself can be connected to the Internet to update its content. The micro-server can also reroute Internet request to its web server.

Figure 2A:
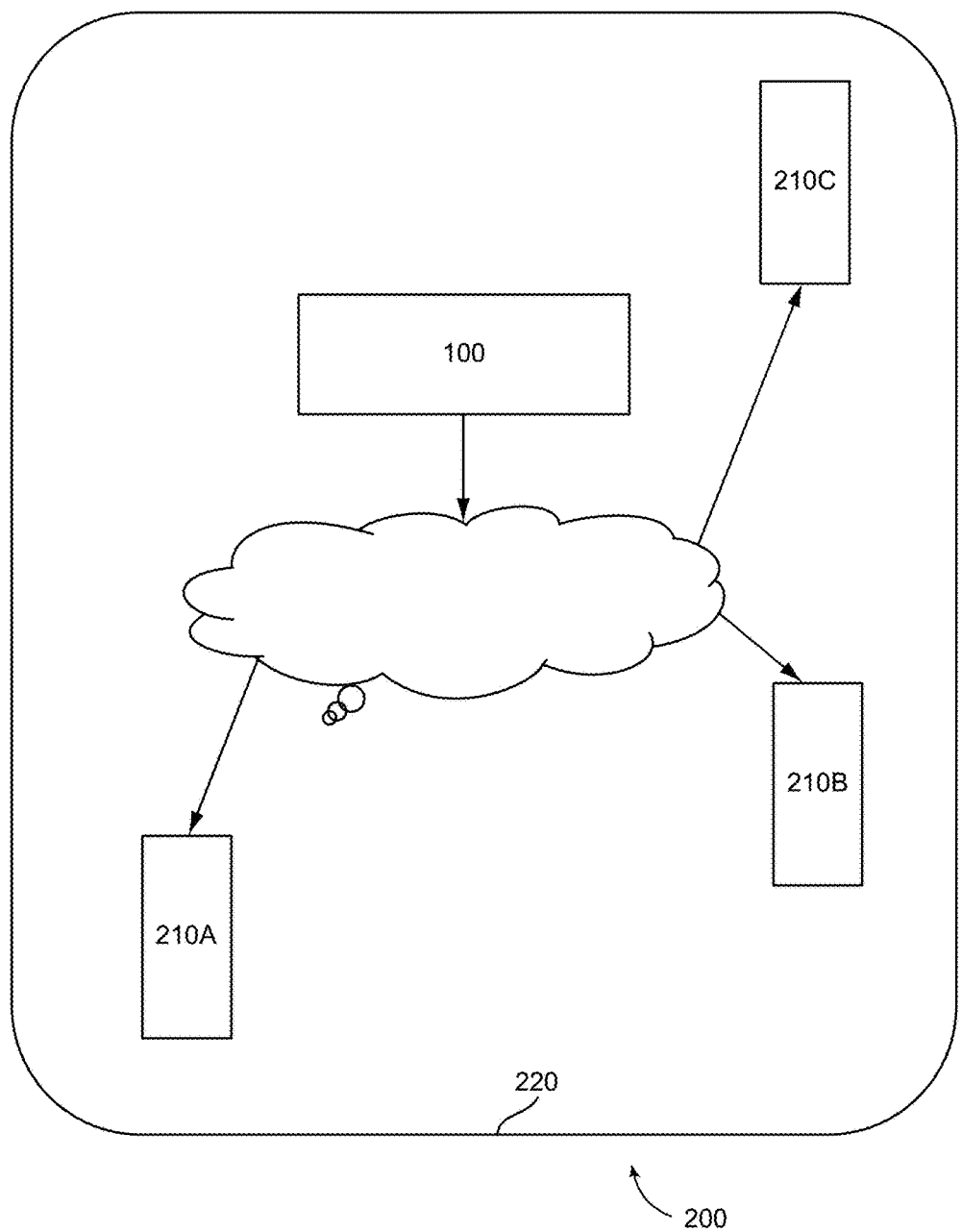
FIGS. 2A and 2B are schematic illustrations showing communication between the micro-server and a plurality of smart devices or other Wi-Fi-enabled devices via a Wi-Fi connection in accordance with an embodiment of the invention.
Figure 2B:
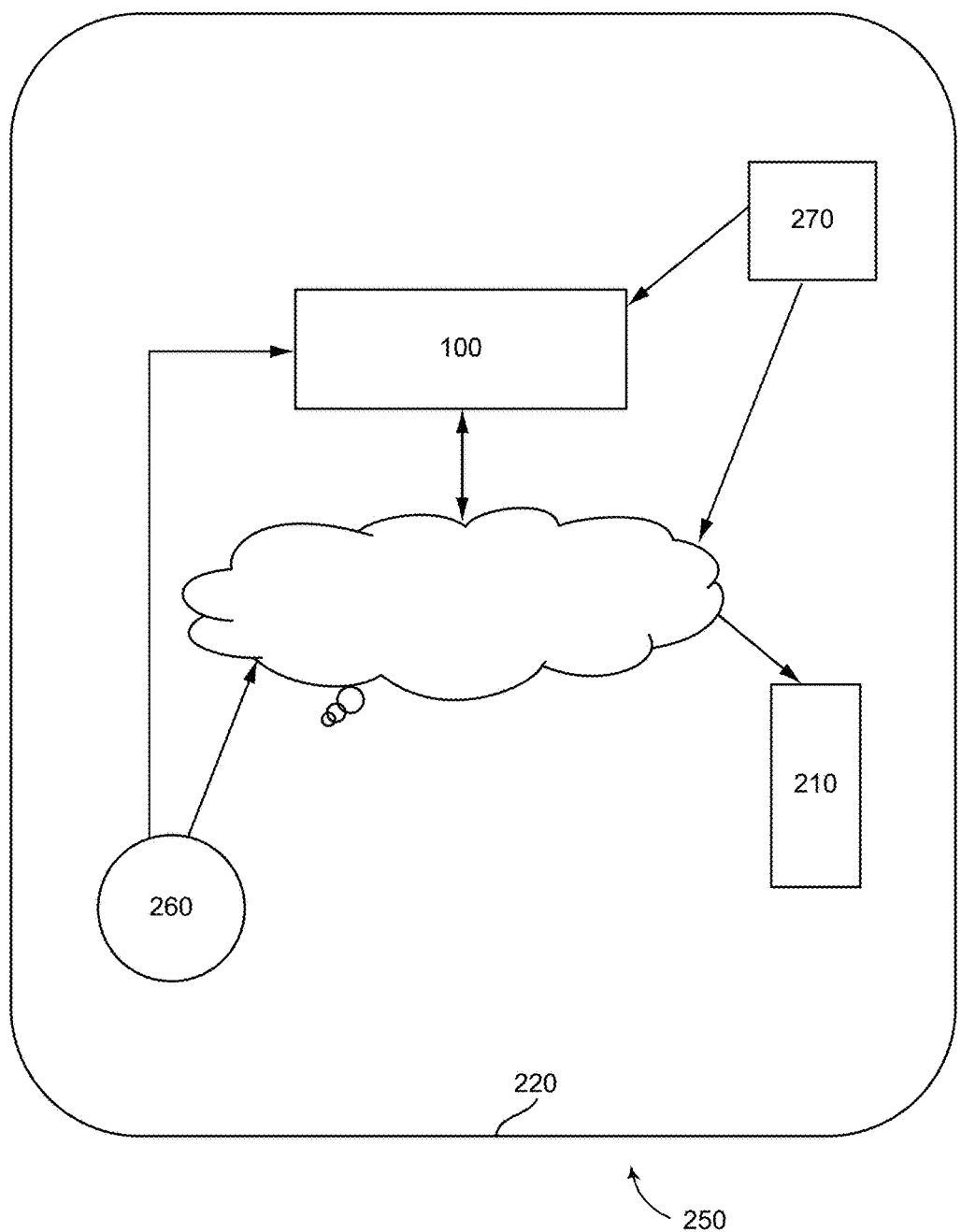

FIG. 2A is a schematic illustration of one embodiment of the invention 200. The micro-server 110 can facilitate wireless communication with smart devices 210A, 210B and 210C (together referred to as "devices 210") within an encapsulated area 220. The encapsulated area 220 may be dependent on the range of the Wi-Fi network. The integrated or external wireless AP, described earlier, can provide the devices 210 with appropriate communication configuration information, for example, including a Service Set ID ("SSID") and optional private shared key ("PSK") for encryption, in response to accepted communication requests. The devices 210 can use the communication configuration information to communicate with the micro-server 110. The devices 210 are essentially "locked" to the micro-server 110. Subsequent to micro-server 110 establishing wireless communication with the devices 210, it can engage in further communication. The further communication can include pushing the specific information to the devices 210. The specific information may be pre-stored or dynamic real-time content. In one embodiment, the specific information comprises a user selected URL. When the URL is communicated to the devices 210, each connected device 210 will be able to display the web page associated with the URL. The information related data can be sent using any of a variety of communication protocols, including: Internet Protocol ("IP"), Transmission Control Protocol ("TCP"), User Datagram Protocol ("UDP"), Hypertext Transfer Protocol ("HTTP"), Real-time Transport Protocol ("RTP"), Real Time Streaming Protocol ("RTSP"), AirPlay (which uses UDP for streaming and is based on RTSP), Digital Audio Access Protocol ("DAAP"), and other protocols.

Some applications require data collection for over a period of time. Alternately, they may require data to be retrieved periodically and manually due to network constraints and cost constraints. These constraints may pose certain difficulties and challenges in collecting the data over an Internet connection. Therefore, according to another embodiment, as shown in FIG. 29, micro-server 110 is configured to recognize and establish a Wi-Fi connection with a smart device 210. The micro-server 110 may be connected directly to, a sensor device 260 and an information appliance 270 within an encapsulated area 220. Alternately, the sensor device 260 and/or the information appliance 270 may be connected to the micro-server 110 by a wireless connection. The micro-server 110 is configured to dynamically received data from the sensor device 260 and the information appliance 270. As used herein, the term "sensor device" includes any object that detects and responds to a change in its environment. As used herein, the term "information appliance" includes a computing device or a device that is configured to perform an electronic function such as, playing music or a virtual reality game. The micro-server 110 analyzes the received data and communicates the analyzed data to the smart device 210 over the Wi-Fi connection.

Figure 3:
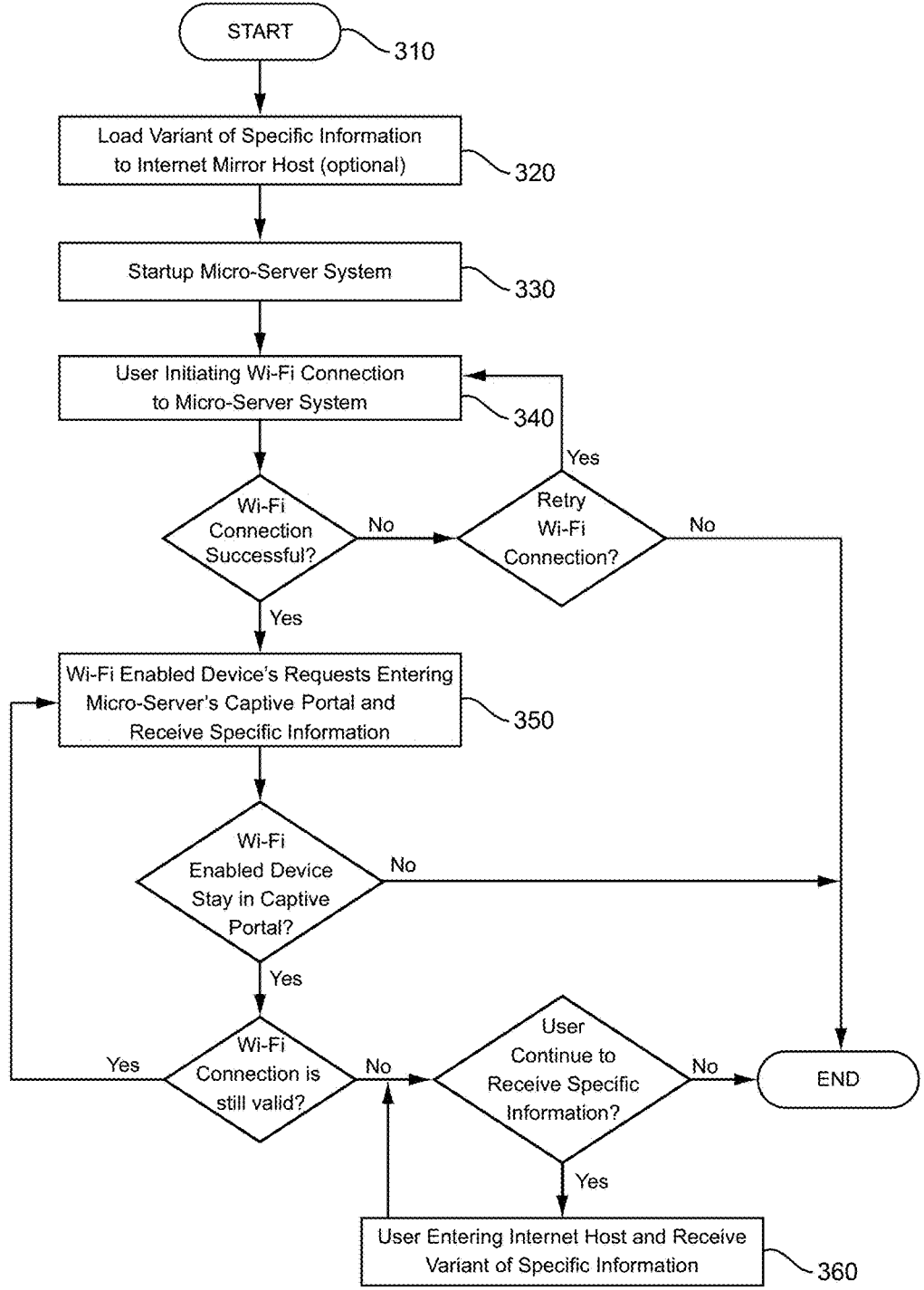
FIG. 3 illustrates an exemplary control and process flowchart for delivering specific information to a connected Wi-Fi-enabled device in accordance with an embodiment.

FIG. 3 represents a control and process flowchart for delivering specific information to smart devices connected to a micro-server. The information is delivered in an encapsulated area. As used herein, the term "encapsulated area" includes an area covered by the range of the micro-server's integrated wireless AP or an external wireless AP that is connected to the micro-server. The process commences at Step 310.

As shown in Step 320, a variant of the specific information may be optionally loaded to an Internet Mirror Host. Advantageously, this allows the user to access the specific information even when the smart device is no longer connected to the micro-server.

Figure 6A:
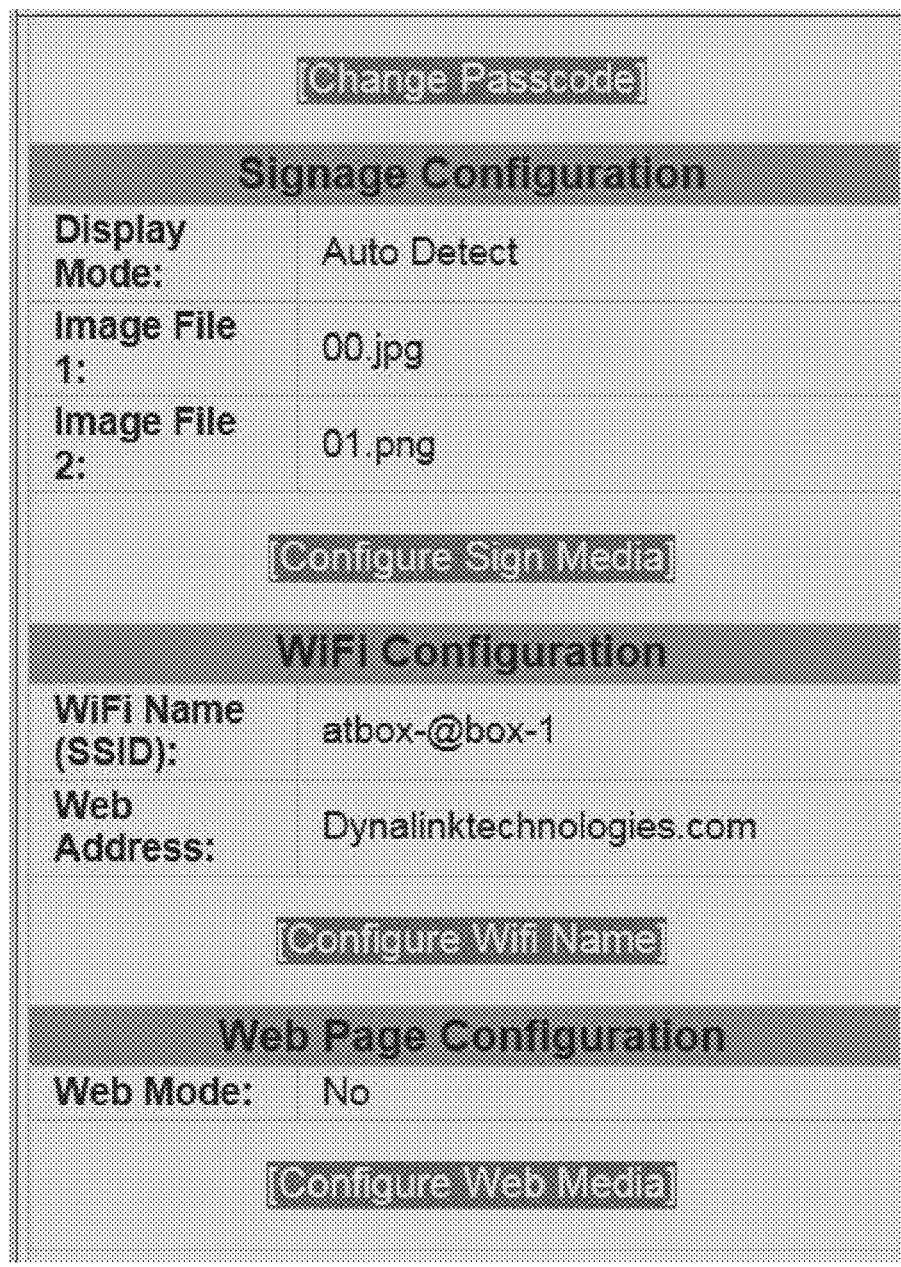
FIGS. 6A-6B illustrate an exemplary micro-processor configuration screen in accordance with an embodiment.
Figure 6B:

The micro-server is started up in Step 330. The step of starting up the micro-server further involves a plurality of steps. The steps may include configuring the micro-server hostname; configuring the DHCP IP address lease range and duration; configuring a DNS domain to IP address resolution; configuring the DNS and/or network routing rules to enable a "captive portal function" at least on Wi-Fi network connection; configuring the Web server to accept requests via the Wi-Fi network connection; configuring the Web server to execute programs to generate dynamic content and/or loading the specific information from the non-volatile memory module; configuring the AP to broadcast SSID; and configuring the database to store security information, application configuration, and the specific information. The configurations may be stored in the non-volatile memory module. An exemplary setup screen is shown in FIGS. 6A-6B.

The step of configuring the Web server to execute programs further comprises configuring a content specific application software loaded in the memory to generate web responses to the Wi-Fi-enabled smart device to redirect to the pre-configured URL; and configuring the application software to allow users of the smart device to modify the configurations and specific information. The pre-configured URL may be selected from the group consisting of: an invalid domain name from Internet, a valid domain name from Internet and an IP address. The terms "captive portal" and "pre-configured URL" are used interchangeably herein.

Next, as shown in Step 340, a wireless/Wi-Fi connection is initiated with a user's Wi-Fi-enabled smart device. Advantageously, Internet access is not required to connect to the micro-server. This step further involves connecting the smart device to the Wi-Fi AP SSID and establishing the Wi-Fi connection from the micro-server to the smart device using standard TCP/IP and DHCP protocols. In one embodiment, the step of connecting the smart device further comprises allowing a user of the smart device to manually select the SSID. Alternately, a software app executing on the smart device can automatically scan and select the SSID with pre-defined naming patterns.

The step of establishing the Wi-Fi connection involves establishing an unsecured connection. Alternately, either a one-way secure connection or a two-way (mutual) secure connection can be established. The one-way secure connection method includes the following steps: facilitating the connection by the software app executing on the smart device to the micro-server; logging in to the Web server by the software app by providing a valid credential for authentication; and allowing the software app to start transferring data after successful authentication. The two-way (mutual) secure connection method further comprises the steps of: executing the software app on the smart device connecting to the micro-server; logging in to the Web server by the software app by providing a valid credential for authentication, wherein the Web server responds a valid credential to the software app for authentication, and wherein the software app starts transferring data after successful mutual authentication.

If the connection with the user device is not successfully, the connection is retried until it is successful or times out after a predetermined time period. If the Wi-Fi connection is successfully established, as shown in Step 350, the Wi-Fi-enabled device can request access to the micro-server's captive portal. The user of the Wi-Fi-enabled device can then receive specific information from the web server via captive portal.

The specific information may be typically selected from the group consisting of stored data on the non-volatile memory module, real-time data from the Web server and a combination of the stored data and real-time data.

The contents of the stored data may be selected from a plurality of sources. In one embodiment, the content may be selected from the group consisting of commercial advertisements; directional and navigation information; directory information; presentations of at least one object; presentations of at least one area; collected data from combinations of the ports and the Ethernet and USB interfaces.

The stored data further includes a plurality of content forms. For example, contents in form of web-compliant formats including but not limited to HTML, XML, XAML, JavaScript, etc; content in form of digital video formats including but not limited to AVI, MP4, MOV, FLV, SBS, etc; content in the form of digital video streaming including but not limited to two dimensional (2D), three dimensional (3D), virtual reality (VR), 360 degree stitched formats, etc; content in the form of digital image formats including but not limited to JPG, PNG, GIF, TIFF, BMP, etc; content in form of digital audio formats including but not limited to MP3, WAV, etc; content in form of digital document formats including but not limited to PDF, Microsoft Office formats, ASCII, etc; content in form of ASCII; and/or content in form of binary data.

The real-time data may include content in the form of digital video streaming including but not limited to two dimensional (2D), three dimensional (3D), virtual reality (VR), 360 degree stitched formats, etc; content in the form of digital audio streaming; content in the form of ASCII data; and/or content in the form of binary data.

The directory information may include, without limitation, a building directory, a directory of objects or points of interest in the area near-by encapsulated area, and combinations thereof. The directional and navigation information may include, without limitation, directional or navigation information from one geographical area to another geographical area in forms of text and/or graphics. The geographical area may include, without limitation, the encapsulated area, an area near the encapsulated area inside the same structure, one of the areas surrounding the encapsulated area and an area outside the encapsulated area that may be reached only by transportation means.

Figure 7:
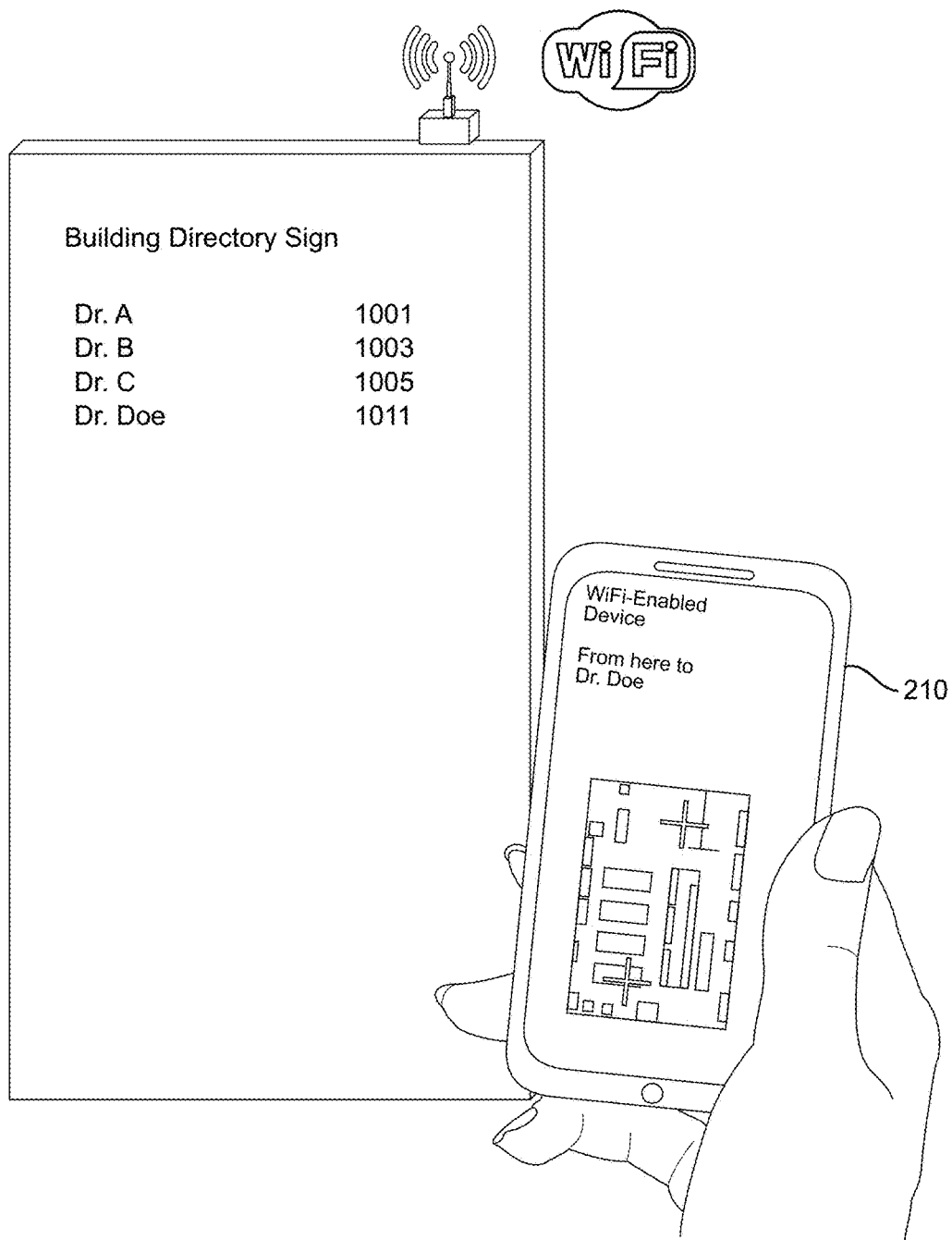
FIG. 7 depicts an exemplary directory on a display of a Wi-Fi-enabled device in accordance with an embodiment.

An exemplary directory display on a Wi-Fi-enabled device 210 is provided in FIG. 7. The directory information can be provided in the form of a graphic or text from where the Wi-Fi-enabled device determines a specific location in the directory. The directory can also be used, for instance, for browsing products within an encapsulated area, such as, in a retail store and for providing directional information to an object of interest.

The directional and navigational information may include, without limitation, providing directional information from an encapsulated area to the location of a specific item, area, or buildings, including but not limited to retail stores, supermarkets, warehouses, factory inventory storage, public storages, shopping malls, parks, museums, zoos, hiking trails, biking trails, transportation depot etc.

The presentation of objects and area may include providing dynamic or automatic self-guided tours to viewers/users with their smart devices connected to the micro-server and providing automated visual/audio guided tours in areas including but not limited to retail stores, supermarkets, warehouses, factory inventory storage, public storages, shopping malls, parks, museums, zoos, hiking trails, hiking trails, etc.

The self-guided tours may include, without limitation, multi-media presentation of an object or an area, video presentation with optional multilingual closed captions of an object or an area; audio presentation of an object or an area, data sheet of an object, map of an area, image files of an object, and image files of an area.

Figure 8:
FIG. 8 depicts an exemplary presentation of an object on a display of a Wi-Fi-enabled device for use in a guided tour in accordance with an embodiment.

An example of a display for providing a presentation of an object on a user's Wi-Fi-enabled device 210 is shown in FIG. 8. The display can be used in guided tours. The user can be provided multi-media content, including 3D, 360-degree stitched and VR format of an object, such as, an exhibit in a museum, or points of interest in a nearby vicinity, for example, in a tour of an area.

Figure 9:
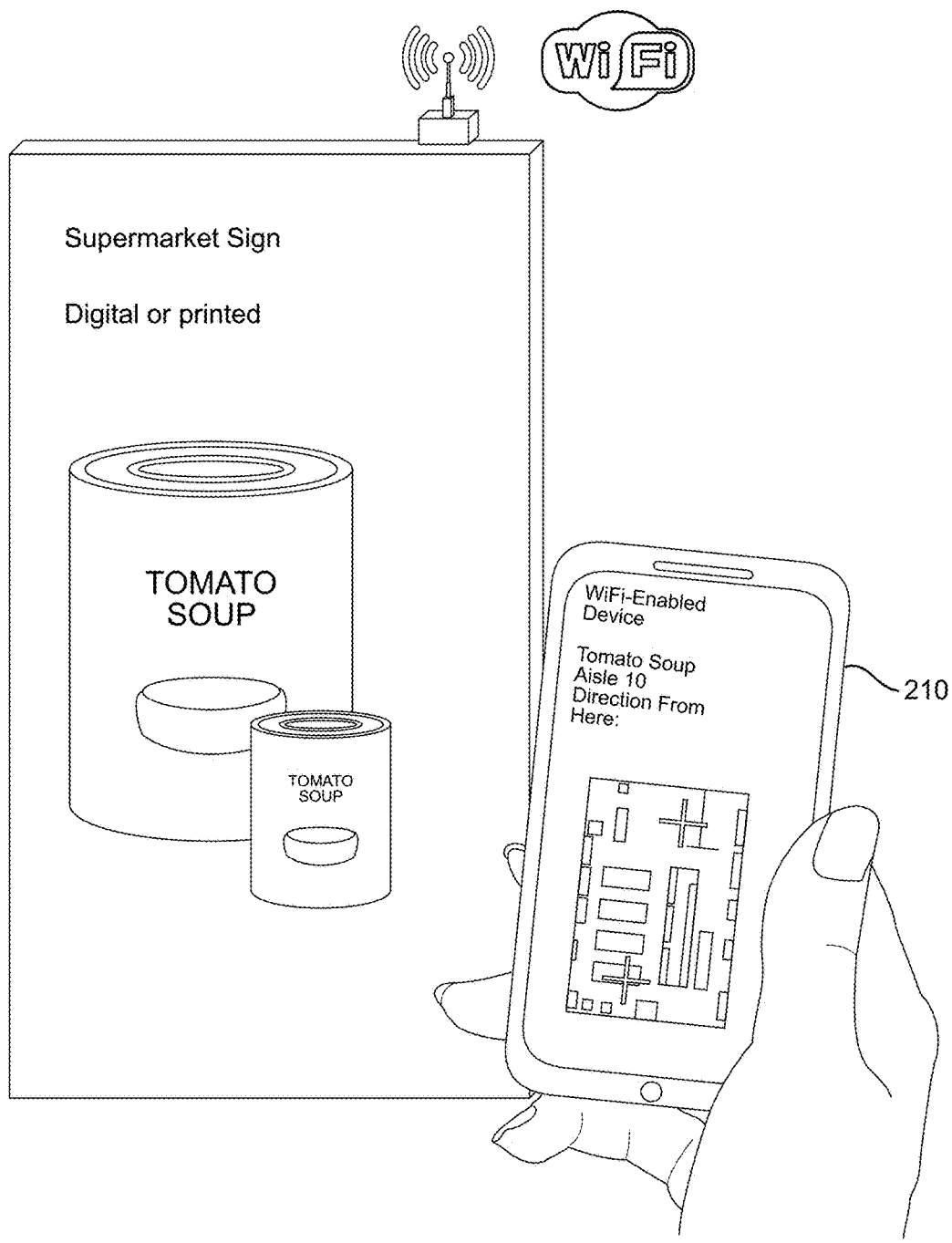
FIG. 9 depicts an exemplary wireless directory on a display of a Wi-Fi-enabled device in accordance with an embodiment.

FIG. 9 depicts an exemplary wireless directory on a display of a Wi-Fi-enabled device 210 for use in determining the location of a retail product in a supermarket in accordance with an embodiment.

Figure 10:
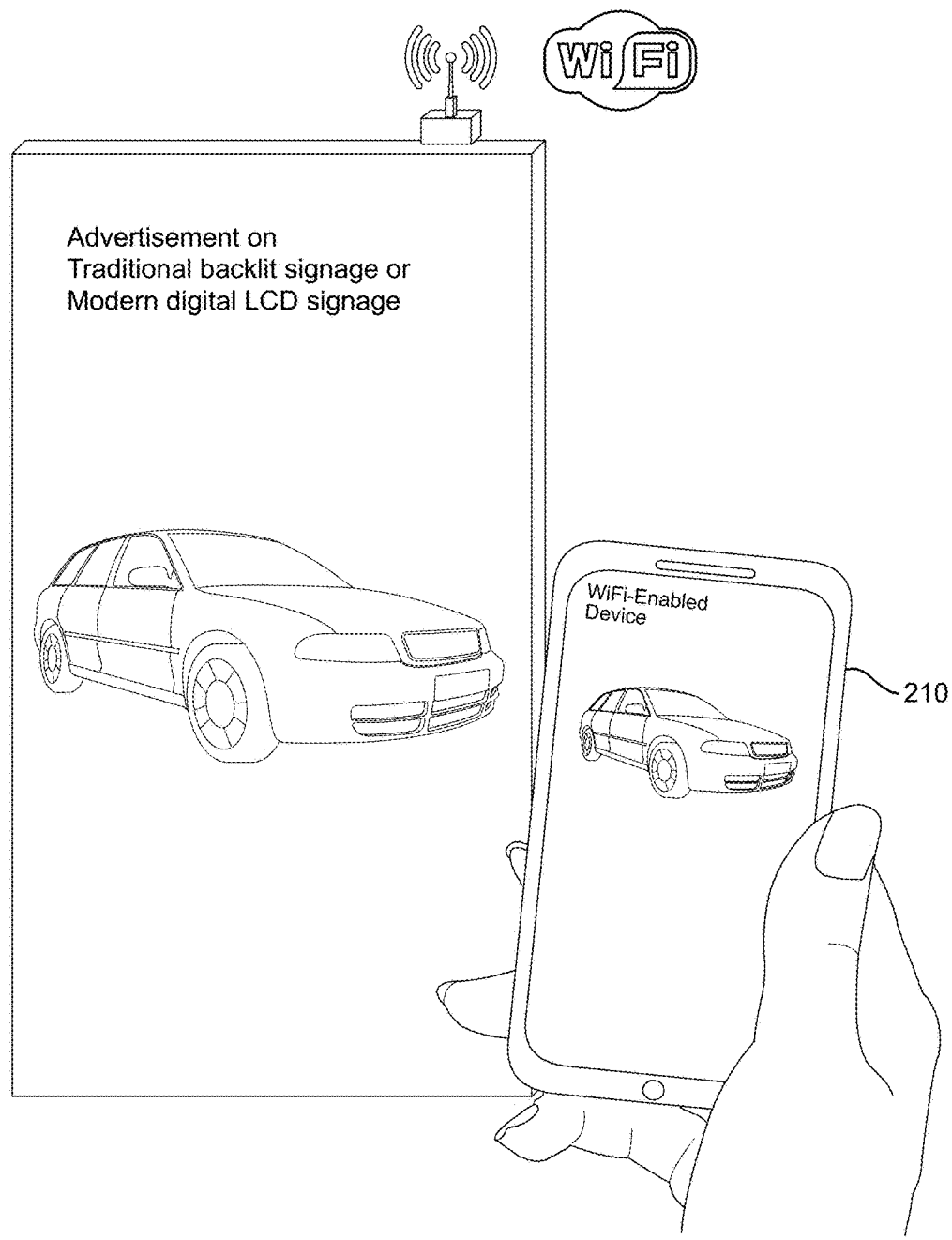
FIG. 10 depicts an exemplary advertisement on a display of a Wi-Fi-enabled device in accordance with an embodiment.

FIG. 10 depicts an exemplary advertisement on a display of a Wi-Fi-enabled device 210. When used with advertising signage, in addition to access to specific information on the goods or services, the micro-server can also allow the user to download brochures, datasheets and coupons.

A URL from a valid Internet address may be used by the micro-server and can be retained on the browser of the Wi-Fi-enabled device such that the users are still able to obtain the same or a variant of the information from the planted URL from an alternate website on the Internet even after disconnecting the Wi-Fi connection from the micro-server.

When the micro-server is used as a gateway for collected data, it can store the collected data into its database and make it available to the connected smart devices. The micro-server can transmit either or both of collected or real-time data to the connected devices.

The step of collecting real-time data involves connecting at least one or more digital data sources to the micro-server and starting the execution of the content specific application software. The digital data source is selected from the group consisting of at least one of the input devices discussed earlier, a data acquisition apparatus, a data storage medium and a data server. The step of connecting at least one digital data source to the micro-server further includes the steps of connecting at least one networked digital data source to the Ethernet interface; connecting at least one smart device as a digital data source to the Wi-Fi AP; connecting at least one digital data source to the USB interface; connecting at least one digital data source to the serial port; connecting at least one digital data source to the SPI bus; and/or connecting at least one digital data source to the inter-integrated circuit bus.

The content specific application software receives data from one or more digital data sources. The content specific application software can then process the received data to processed data and the stored data. The content specific application software can then transfer the processed data or the stored data to the Web server.

The step of connecting at least one smart device as digital data source to the Wi-Fi AP further includes the steps of: enabling the smart device to connect to the micro-server; allowing the smart device to log in to the Web server by providing a valid credential for authentication, wherein the Web server responds a valid credential to the Wi-Fi-enabled device for authentication, and wherein the Wi-Fi-enabled device starts transferring data to the micro-server after successful mutual authentication.

The step of connecting at least one networked digital data source to the Ethernet interface further comprises the steps of: connecting the networked digital data source to the micro-server through the Ethernet interface; logging in to the Web server, by the networked digital data source, by providing a valid credential for authentication, wherein the Web server responds a valid credential to the networked digital data source for authentication, and wherein the networked digital data source starts transferring data to the micro-server after successful mutual authentication.

The smart device then receives the specific information for further processing. The step of further processing further involves displaying the specific information on the smart device using a web browser and/or software app; storing the specific information in a data storage of the smart device; and/or sending user inputs from the smart device to the Web server or the content specific application software, in response to the specific information. The step of the content specific application software transfer of the processed data or the stored data to the Web server further includes the steps of: inserting, by the specific application software, the processed data to a database and retrieving, by the Web server, the processed data from the database. The step of the content specific application software transfer of the processed data or the stored data to the Web server further includes the steps of: saving, by the specific application software, the processed data to a file in the non-volatile memory module and, retrieving, by the Web server, the processed data from the file. The method further includes the steps of: logging in the database, by the specific application software and the Web server, by providing a valid credential before any data transfer and, logging out of the database, by the specific application software and the Web server, after all data is transferred.

If the Wi-Fi-enabled device does not stay in the captive portal, the process terminates. The smart device can then be disconnected from the Wi-Fi connection. The step of disconnecting the Wi-Fi connection further involves one of disconnecting the Wi-Fi connection by the smart device user commands or moving the smart device outside the encapsulated area or rejecting the smart device's DHCP IP address lease renewal request by the micro-server.

On the other hand, if the Wi-Fi-enabled device stays in the captive portal and the connection is deemed valid, the Wi-Fi-enabled device can continue to access the specific information.

if the connection is no longer valid but the user wishes to continue to receive the specific information, as shown in Step 360, the user may be directed to enter an Internet host and receive a variant of the specific information. The micro-server causes a redirection of all Internet requests from the smart devices(s) to a Web server running on the micro-server. The step of requesting the same or a variant of the specific information from the Internet further comprises the following steps: refreshing the contents on the web browser and/or software app using the pre-configured URL, already planted to the web browser or software app and receiving the same or a variant of the specific information from the web server using the valid domain name on Internet.

Figure 4:
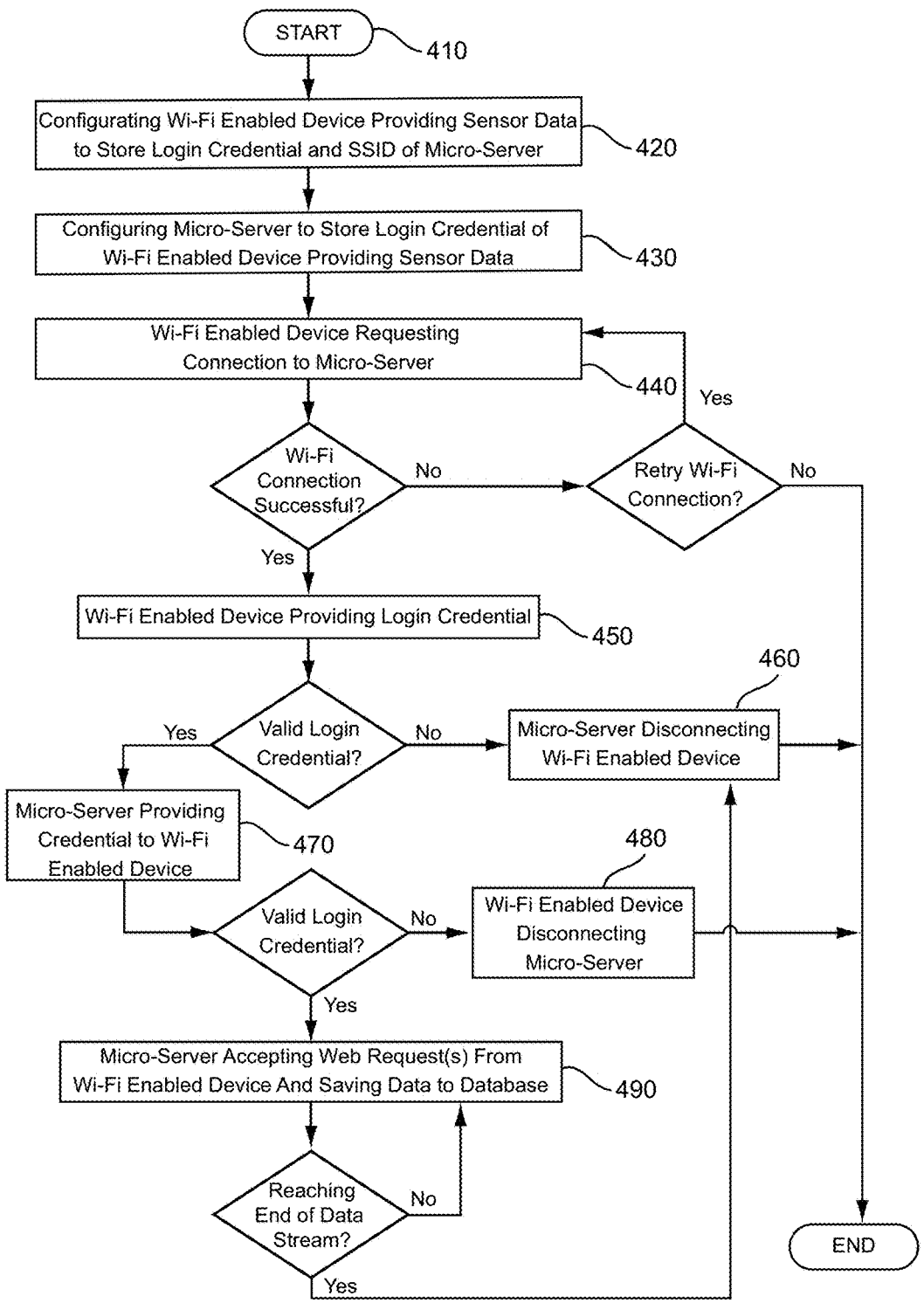
FIG. 4 illustrates an exemplary control and process flowchart for receiving sensor data over Wi-Fi in accordance with an embodiment.

Referring now to FIG. 4, an exemplary control and process flow for the micro-server to receive sensor data from a Wi-Fi-enabled device is illustrated. The process starts at step 410. In Step 420, a Wi-Fi-enabled device, that can provide sensor data, is configured to store the login credentials and the SSID of the micro-server. Further, the micro-server is also configured to store the login credentials of the Wi-Fi-enabled device that provides sensor data, as shown in Step 430.

As shown in Step 440, the Wi-Fi-enabled device then tries to connect to the micro-server using its Wi-Fi connection. If the connection is not successful, it is retried until the device successfully connects or times out after a predetermined time.

If the connection is successful, the Wi-Fi-enabled device provides its login credentials. If the login credentials are not validated, as shown in Step 460, the micro-server disconnects the Wi-Fi-enabled device as an untrusted device and the process terminates.

However, if the login credentials are validated, the micro-server then provides its login credentials to the Wi-Fi-enabled device, as shown in Step 470. If the Wi-Fi-enabled device cannot validate the login credentials, as shown in Step 480, it disconnects the micro-server and the process terminates.

If the Wi-Fi-enabled device validates the login credentials of the micro-server, the micro-server can start accepting web requests from the Wi-Fi-enabled device and can start saving data to the database, as shown in Step 490. The process can then continue until the end of the data stream is reached. Upon reaching the end of the data stream, the micro-server disconnects the Wi-Fi-enabled device (as in Step 460) and the process terminates.

Figure 5:
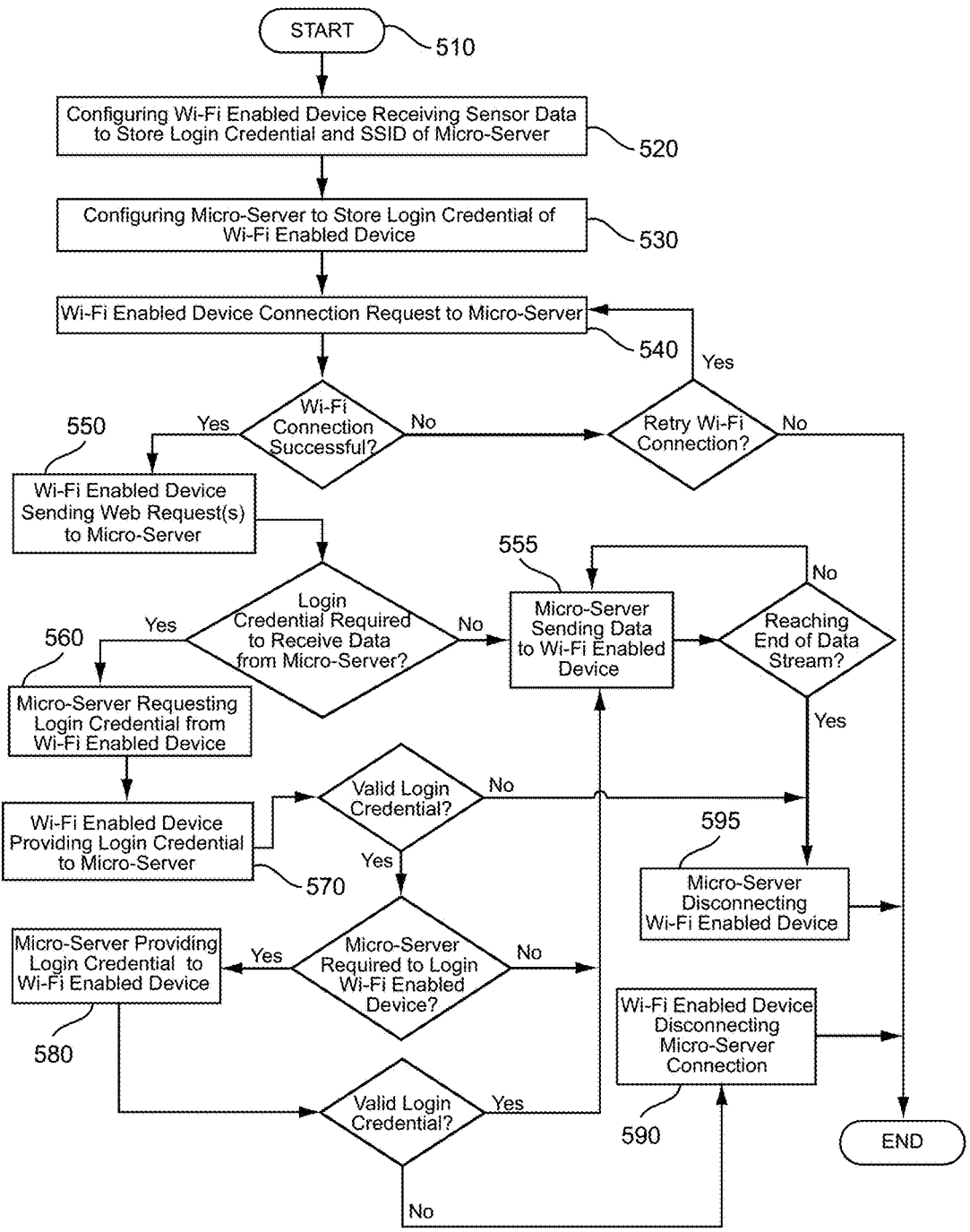
FIG. 5 illustrates an exemplary control and process flowchart for providing specific information or sensor data in accordance with an embodiment.

FIG. 5 depicts an exemplary control and process flow for providing specific information and/or sensor data. The process starts at step 510. In Step 520, a Wi-Fi-enabled device, that can receive sensor data, is configured to store the login credentials and the SSID of the micro-server. Further, the micro-server is also configured to store the login credentials of the Wi-Fi-enabled device that provides sensor data, as shown in Step 530.

As shown in Step 540, the Wi-Fi-enabled device then tries to connect to the micro-server using its Wi-Fi connection. If the connection is not successful, it is retried until the device successfully connects or it times out after a predetermined time.

If the connection is successful, the Wi-Fi-enabled device sends a web request to the micro-server. If the login credentials to receive data from the micro-server are validated, the micro-server then requests the login credentials from the Wi-Fi-enabled device, as shown in Step 560. If the login credentials of the Wi-Fi-enabled device are valid and if the micro-server is required to login to the Wi-Fi-enabled device, it provides its login credentials to the Wi-Fi-enabled device, as shown in Step 580. If the Wi-Fi-enabled device cannot validate the credentials, it disconnects the micro-server, as shown in Step 590 and the process terminates.

If the Wi-Fi-enabled device can validate the credentials, the micro-server can send data to the Wi-Fi-enabled device, as shown in Step 555. The data is continued to be transmitted until the end of the data stream is reached. At this point, as shown in Step 595, the micro-server disconnects the Wi-Fi-enabled device and the process terminates.

According to another embodiment, a method of displaying non-synchronized specific information or content on a display device using the micro-server is disclosed. The non-synchronized specific information may be a combination of content in the form of digital video formats, content in the form of digital image formats, and/or content in the form of digital video streaming. The method includes the steps of: connecting the video and audio interfaces of the micro-server to at least a display device and an audio output device; loading pre-stored specific information from the non-volatile memory module by using the content specific application software; using display software to display the specific information; and changing the display contents based on a predetermined time schedule.

According to yet another embodiment, a method of displaying synchronized specific content or information on a display device using the micro-server is disclosed. The method includes the steps of: connecting the video and audio interfaces to at least a display device and an audio output device; connecting input devices to the micro-server; loading pre-stored specific information from the non-volatile memory module; using video and audio software to play the specific contents on the display device and audio output device; and changing the video and/or audio contents based on input data.

The display device can be selected from the group consisting of: a computer monitor, an analog TV, a digital TV, digital projection devices and any video output devices. The display device may further include a display device with touch sensor or a display device with a touch screen. The audio output device is selected from the group consisting of a buzzer, a speaker, headsets, and any other suitable audio output devices. The input devices may include sensors on the smart device (for example, all built-in input devices on the smart device including but not limited to: a touch display screen, audio input device including but not limited to microphones, accelerometers, directional sensors including but not limited to magnetometers, navigation sensors including but not limited to GPS receiver, gyro, inclination sensors including but not limited to tilt sensors), gesture sensors, cameras, infrared imaging sensors, electro-mechanical sensors, audio input sensors, temperature sensors, humidity sensors, environmental sensors, pressure sensors, proximity sensors, gas sensors, and/or data acquisition systems. The input data further includes data from at least one of the digital data sources and/or events from a pre-defined time schedule stored in the non-volatile memory module. The step of loading pre-stored specific information includes the step of using the content specific application software to load the specific information.

According to another embodiment, a method of changing a multi-media presentation based on data input from the micro-server is disclosed. The multi-media presentation may include a three-dimensional (3D) video displayed on the smart device with 3D support. The multi-media presentation may also include a virtual reality (VR) video streaming displayed on a Wi-Fi-enabled device with VR support. The method includes the steps of having the micro-server: obtain measurement data from the sensors on the Wi-Fi-enabled device, process the measurement data, modify the specific information in real-time based on the received measurement data in real time and submit the modified specific information from the micro-server to the smart device. The step of modifying the specific information further involves enabling the micro-server to: superimpose other video stream onto the video stream to the smart device, and to superimpose the audio inputs onto the audio streaming to the smart device.

According to yet another embodiment, a method of merging the multi-media presentation based on data input from the smart device and the video stream from its own camera includes the steps of: using the video stream from the camera on the Wi-Fi-enabled device as the background of the displayed video on the Wi-Fi-enabled device; allowing the micro-server to stream the specific information to the Wi-Fi-enabled device and allowing the specific information to be merged into the background video displayed on the Wi-Fi-enabled device; enabling the Wi-Fi-enabled device to send sensor data from sensors to the micro-server; facilitating the micro-server to use the received sensor data to make adjustments on the specific information to the Wi-Fi-enabled device. The method may be accomplished by a client-side software app running on the Wi-Fi-enabled device.

Nowadays, advertising signs can be seen anywhere like in the shopping mall, bus stop, transit lounge, airport, but very often they are not eye catching and treated as decoration and ignored by viewers. In many cases, poster advertisements are designed to be simple and may not include detailed information. There are new technologies such as NFC and QR code to direct viewers to view the advertising campaigns' websites via mobile devices, however, these technologies are not supported on all popular mobile devices. For example, NFC is not supported in IPhones™ except for Apple™ Pay. Other phones require viewers to hold their devices very close range in order to receive ad information, and only one device can receive the information at any given time. QR codes requires QR code reader apps which are not pre-installed on all smart mobile devices.

The one or more embodiments of the invention present a better way to pass advertising information to viewers. For example, the embodiments of the invention can enhance traditional advertising media, such as printed and digital signage in order to make them more attractive. By using lighting effects, motion effects, and audio effects, it can draw more attention from viewers. Furthermore, using a paired mobile device, it can even direct viewers to the advertisement campaign website over a private wireless/Wi-Fi connection in a more massive and more convenient fashion. Thus, it can bring more information and different experiences to the viewers by using Wi-Fi and web browsing technologies. Viewers can connect to the web server embedded onto the media via Wi-Fi connection. Once viewers connect their mobile devices to the embedded web server, viewers can get more information about the advertisements from their web browsers and even interact with media special effects. When viewers move away from the Wi-Fi coverage, the advertisement campaign webpage will not disappear from their mobile device web browsers because the web page loaded is now connected to a webserver on the Internet that has the same advertisement campaign webpage. Unlike NEC and QR code, the Wi-Fi can be supported by all smart mobile devices, including eBook readers. Unlike Wi-Fi hotspot advertising, the embodiments of the invention do not require Internet connection, Internet connection is optional.

The embodiments of the invention can be used in shopping malls to guide shoppers and even provide e-coupons. The technology can be used on outdoor signs along the streets. It can also be used with signs on vehicles, like taxi and buses. With their mobile devices connected, viewers walking along the street or sitting in moving vehicles are able to receive information over Wi-Fi connection from the media whether it is on a street sign or on another moving vehicle. It can also be used in airport terminals, in baggage claim areas to provide additional advertisement information and entertainment over Wi-Fi. Viewers do not need to stand next to the sign like NFC and QR code to get additional information. Instead, they can comfortably stand where they are and get the advertisement information over Wi-Fi on their connected smart devices.

If the specification states a component or feature "may", "can", "could", or "might" be included or have a characteristic, that particular component or feature is not required to be included or have the characteristic.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, to avoid obscuring the present invention.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It is to be understood that the above description is intended to be illustrative, and not restrictive. Many other embodiments will be apparent to those of skill in the art upon reading and understanding the above description. The scope of the invention should therefore be determined with reference to the appended claims, along with the full scope of equivalents to which such claims are entitled.

The invention claimed is:

1. A method for providing access to information in a localized area, comprising:
   providing a micro-server, wherein the micro-server includes:
   a wireless access point for providing Wi-Fi connection in the localized area;
   a Web server, the Web server configured to access real-time data, wherein the real-time data comprises content in a plurality of formats, wherein the format comprises at least one of a digital video streaming format, comprising, two dimensional, three dimensional, virtual reality, 360-degree stitched format; a digital audio streaming format; an ASCII data format; and a binary data format; and
   a memory, wherein the memory includes pre-stored specific information, wherein the pre-stored information includes content in a plurality of digital formats, wherein the plurality of digital formats is selected from the group consisting of: a web-compliant format, a digital video format, a digital video streaming format, comprising: two dimensional, three dimensional, virtual reality, and a 360-degree stitched format, a digital image format, a digital audio format, a digital audio streaming format, a digital document format, an ASCII data format, and a binary data format;
   pairing the micro-server to at least one Wi-Fi enabled smart device in the localized area;
   configuring the micro-server to:
   (i) block all Internet requests from the paired smart device to the Internet; and
   (ii) redirect the Internet requests from the paired smart device to the Web server,
   wherein networking controls of the micro-server lock in the paired smart device without providing Internet access to the paired smart device; and
   communicating the pre-stored specific information to the paired smart device,
   wherein the pre-stored specific information is customizable to enhance a user experience in the localized area.

2. The method according to claim 1, wherein the pre-stored specific information is displayed on a web browser of the paired smart device.

3. The method according to claim 1, wherein the micro-server is configured to communicate the pre-stored specific information to the paired smart device in the absence of Internet connectivity.

4. The method according to claim 1, wherein the Web server is configured to communicate real time data to the paired smart device.

5. The method according to claim 1, wherein the localized area comprises an area covered by the wireless access point.

6. The method according to claim 1, wherein the pre-stored information is provided by an operator of the micro-server.

7. The method according to claim 1, wherein the pre-stored information and/or real-time data is selected from a plurality of data sources.

8. The method according to claim 7, wherein the plurality of data sources is selected from the group consisting of: commercial advertisements, directional and navigational information, directory information, presentations of an object, and presentations of a geographical area.

9. The method according to claim 8, wherein at least one data source is a digital data source.

10. The method according to claim 8, the method further comprising the step of terminating the pairing of the micro-server to the Wi-Fi enabled smart device when the Wi-Fi enabled smart device moves out of the localized area.

11. The method according to claim 10, further comprising loading a variant of the specific information on an Internet mirror site, and wherein the user can access the specific information on the Internet mirror site when the smart device is no longer paired to the micro-server.

12. A micro-server comprising:
a wireless access point for providing Wi-Fi connection in the localized area;
a Web server, the Web server configured to access real-time data, wherein the real-time data comprises content in a plurality of formats, wherein the format comprises at least one of a digital video streaming format, comprising, two dimensional, three dimensional, virtual reality, 360-degree stitched format; a digital audio streaming format; an ASCII data format; and a binary data format; and
a memory, wherein the memory includes pre-stored specific information, wherein the pre stored information includes content in a plurality of digital formats, wherein the plurality of digital formats is selected from the group consisting of: a web-compliant format, a digital video format, a digital video streaming format, comprising: two dimensional, three dimensional, virtual reality, and a 360-degree stitched format, a digital image format, a digital audio format, a digital audio streaming format, a digital document format, an ASCII data format, and a binary data format;
wherein the micro-server is paired to a Wi-Fi enabled smart device in the localized area,
wherein the micro-server is configured to:
(i) block all Internet requests from the paired smart device to the Internet; and
(ii) redirect the Internet requests from the paired smart device to the Web server, wherein networking controls of the micro-server are configured to lock in the paired smart device without providing Internet access to the paired smart device,
wherein the micro-server is configured to communicate the pre-stored specific information to the paired smart device, and wherein the pre-stored specific information is customizable to enhance a user experience in the localized area.

13. The micro-server according to claim 12, wherein the pre-stored specific information is displayed on a web browser of the paired smart device.

14. The micro-server according to claim 12, wherein the micro-server is configured to communicate the pre-stored specific information to the paired smart device in the absence of Internet connectivity.

15. The micro-server according to claim 12, wherein the Web server is configured to communicate real time data to the paired smart device.

16. The micro-server according to claim 12, wherein the localized area comprises an area covered by the wireless access point.

17. The micro-server according to claim 12, wherein the pre-stored information is provided by an operator of the micro-server.

* * * * *